United States Patent
Sengupta et al.

(10) Patent No.: US 10,355,952 B2
(45) Date of Patent: *Jul. 16, 2019

(54) AUTOMATIC UPSTREAM SERVICE RESUMPTION AFTER DOWNSTREAM SYSTEM FAILURE

(71) Applicant: Oracle International Corporation, Redwood Shores, CA (US)

(72) Inventors: Aninda Sengupta, Redwood City, CA (US); Steven Gene Wolfangel, St. Louis, MO (US); Philippe Le Mouel, Seattle, WA (US); Dennis Fuglsang, Ballwin, MO (US); Lixin Tang, Glendora, CA (US); Sherry Weng, Arcadia, CA (US); Bo Stern, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 577 days.

This patent is subject to a terminal disclaimer.

(21) Appl. No.: 15/099,332

(22) Filed: Apr. 14, 2016

(65) Prior Publication Data

US 2016/0316028 A1   Oct. 27, 2016

Related U.S. Application Data

(60) Provisional application No. 62/153,478, filed on Apr. 27, 2015.

(51) Int. Cl.
  *H04L 12/26* (2006.01)
  *H04L 29/06* (2006.01)
  *H04L 29/14* (2006.01)

(52) U.S. Cl.
  CPC .......... *H04L 43/0847* (2013.01); *H04L 43/16* (2013.01); *H04L 69/40* (2013.01); *H04L 69/28* (2013.01)

(58) Field of Classification Search
  CPC ............ G06F 11/0793; H04L 41/0654; H04L 43/0847; H04L 69/28; H04L 69/40
  See application file for complete search history.

(56) References Cited

U.S. PATENT DOCUMENTS 6,505,310 B1   1/2003   Brown et al.
6,735,720 B1   5/2004   Dunn et al.
(Continued)

OTHER PUBLICATIONS

Jacobs, Netflix/Hystrix Wiki, Retrieved from the internet: https://github.com/Netflix/Hystrix/wiki (Year: 2012).*

(Continued)

*Primary Examiner* — Michael A Keller
*Assistant Examiner* — Austin J Moreau
(74) *Attorney, Agent, or Firm* — Kilpatrick Townsend & Stockton, LLP

(57) ABSTRACT

Techniques described herein relate to automatic upstream service resumption after downstream system failure. An automatic resumption module may be configured to monitor a downstream endpoint (of a problematic downstream service provider) and determine when it again successfully can process requests by periodically processing inbound requests (e.g., from suspended upstream service providers) and automatically re-enabling upstream endpoints for the suspended upstream service providers in the case of success. The automatic resumption module may start a trickle feed timer for each upstream endpoint to allow messages to be processed at a configured retry rate while the upstream endpoint remains suspended. The trickle feed timer may be configured to start upon the triggering of a circuit breaker for the involved downstream service. When downstream endpoint invocation succeeds, the automatic resumption module can resume all upstream endpoints associated with the downstream endpoint.

20 Claims, 8 Drawing Sheets

(56) References Cited

U.S. PATENT DOCUMENTS

| | | |
|---|---|---|
| 7,925,931 B1 | 4/2011 | Smith et al. |
| 8,250,479 B2 | 8/2012 | Anderson et al. |
| 8,655,939 B2 | 2/2014 | Redlich et al. |
| 2016/0239371 A1 | 8/2016 | Jose et al. |

OTHER PUBLICATIONS

Nygard, Release It! Design and Deploy Production-Ready Software, Retrieved from the internet: http://www.r-5.org/files/books/computers/dev-teams/production/Michael_Nygard-Design_and_Deploy_Production_Ready_Software-EN.pdf (Year: 2007).*

U.S. Appl. No. 15/099,323, Non-Final Office Action dated Nov. 16, 2017, 13 pages.

Christensen, Application Resilience in a Service-Oriented Architecture, Retrieved from the internet: http://radar.oreilly.com/2013/06/application-resilience-in-a-service-oriented-architecture.html, Jun. 10, 2013, pp. 1-4.

Jacobs, Hystrix, Retrieved from the internet: https://github.com/Netflix/Hystrix/wiki, 2012, pp. 1-5.

U.S. Appl. No. 15/099,323 received a Notice of Allowance, dated Jul. 27, 2018, 5 pages.

* cited by examiner

AUTOMATIC UPSTREAM SERVICE RESUMPTION AFTER DOWNSTREAM SYSTEM FAILURE

CROSS-REFERENCE TO RELATED APPLICATIONS

The present application is a non-provisional of and claims priority to U.S. Provisional Patent Application No. 62/153,478, filed Apr. 27, 2015, entitled "AUTOMATIC UPSTREAM SERVICE RESUMPTION AFTER DOWNSTREAM SYSTEM FAILURE," the entire contents of which are incorporated herein by reference for all purposes.

FIELD

Embodiments of the invention relate to the field of computing system; and more specifically, to automatic upstream service resumption after downstream system failure.

BACKGROUND

The term Service-Oriented Architecture (SOA) generally refers to a software strategy that separates functions from enterprise applications into interoperable, standards-based services, which then may be combined with other services and reused to meet particular business needs. Accordingly, by employing SOA, functionality provided by applications (from potentially multiple vendors) can be "exposed" as one or more services, and then "orchestrated" (e.g., using orchestration capabilities like Business Process Execution Language (BPEL)) into new composite applications. These composite applications may be developed to support an organization's business processes.

Service Component Architecture (SCA) is a software technology created by major software vendors, including IBM, Oracle, and TIBCO. SCA describes a model for building applications and systems using SOA principles, and further builds on open standards, such as Web services, to extend and complement existing SOA approaches.

A basic aspect of SCA is a composite, which is a unit of deployment and provides services that can be accessed remotely. A composite is made up of one or more components, each of which can be directed to performing a particular task or set of tasks. Components may offer their function as "services," and either may be used by other components within the same module (e.g., composite) or may be made available for use outside the module through entry points. Components may depend on services provided by other components—either local or remote—and these dependencies may be referred to as references. References either may be linked to services provided by other components in the same composite, or references can be linked to services provided outside the composite, which potentially can be provided by other composite. Also included within a composite are linkages between references and services, which are referred to as wires.

SOA applications can also utilize bindings (or "adapters"), which refer to the communication protocols used between modules in the system. Accordingly, one or more bindings can be assigned to a single reference, each enabling communication over a different type of protocol.

Over time, software complexity continues to rise and thus, SOA applications similarly increase in complexity. For example, an application may include many composites interacting with each other and other external systems, and each composite may include multiple components. Moreover, with the increased adoption of cloud-services, many such SOA applications may be deployed using a common set of computing resources.

With this increased complexity, it may become difficult to manage these applications. For example, when the performance of the application is negatively impacted, it can be tremendously difficult to identify which, if any, of the portions of a large SOA application are responsible for the performance degradation, and moreover, why those portions are not being performant. Further, when these performance degradations (or failures) occur, it is difficult to prevent the failures from impacting other system resources, prevent in-flight data from being lost, and efficiently recover from such system failures.

Accordingly, there is a tremendous need for better detection of, response to, and recovery from faults occurring in complex SOA systems.

BRIEF SUMMARY

The present disclosure relates to automatic upstream service resumption after downstream system failure. In some embodiments, a system management module of a SOA system may be configured to, after traffic for one or more upstream systems has been suspended from being processed by an application due to a failure at a downstream service provider, monitor the downstream service provider to detect when it again becomes functional and automatically restart the suspended traffic.

In some embodiments, the system management module may implement a circuit breaker module that maintains a circuit breaker data structure specific to a downstream endpoint leading to a downstream service provider. The circuit breaker data structure (or "circuit breaker") may have a set of configurable conditions indicating, for example, a number of requests and a time duration, which together may indicate the particular number of failed requests over an amount of time that will trigger the circuit breaker. When a circuit breaker detects that an associated downstream service provider is unable to process the configured number of requests within the predetermined window of time configured for that circuit breaker, the circuit breaker may be triggered. Upon the triggering of a circuit breaker, an automatic suspension module may identify one or more upstream services providing and/or associated with the particular failed requests, for example, the failed requests having fault entries with timestamps within the specified time window, and may trigger the circuit breaker thereby causing the application to suspend processing of new requests from the identified upstream services.

In some embodiments, the system management module also may implement an automatic resumption module, which may be configured to monitor a downstream endpoint of a downstream service provider from which one or more faults have been detected, and to determine when the downstream service provider comes back up (e.g., begins to successfully process requests). In some cases, the determination may be performed by periodically processing inbound requests, for example, from upstream service providers, and re-enabling upstream endpoints for the suspended upstream service providers in the case of success. Accordingly, in some embodiments, the automatic resumption module may determine, after the processing of traffic for one or more upstream service providers has been suspended, whether the circuit breaker-triggering downstream service provider becomes responsive again, and may automatically re-enable processing for suspended upstream service providers.

In some embodiments, the automatic resumption module may start a "trickle feed" timer for each upstream endpoint, to allow messages through at a configured retry rate. The trickle feed timer may be configured to start upon the triggering of a circuit breaker for the involved downstream service. When downstream endpoint invocation succeeds, the automatic resumption module may resume all upstream endpoints associated with the downstream endpoint. In some embodiments, trickle feed timers may be configured specifically for a particular downstream endpoint. Accordingly, the trickle feed timer for an affected downstream endpoint may affect the trickle feed for the associated upstream endpoint(s). In some embodiments, the "trickle feed" timer can be configured to "trickle" messages from a suspended service according to a configurable time interval (e.g., a "retry rate" of every one minute, every five minutes, etc.).

In some embodiments, when a downstream invocation of a "down" endpoint succeeds, all of the upstream services that were suspended for that endpoint are resumed. This downstream invocation may be the result of a "trickled" message, and/or a message being passed from a completely different flow (e.g., a message not originating from or associated with any of the suspended upstream service providers). However, in some embodiments the trickle feed timer may be configured with a retry rate value time interval of zero ('0'), which may instruct the automatic resumption module to not "trickle" affected messages, and may instead require a manual resumption of service (e.g., by an administrator's command, etc.). Further, manual resumption of service still may be enabled even if a trickle feed is in effect, and thus may allow for an "override." For example, in some scenarios, an administrator may know that a downstream service provider has resumed service, and may quickly restart service by manually resuming the flow of messages, which may occur sooner than a next message would have been trickled through according to the periodic trickle.

Thus, in some embodiments, the automatic resumption module may cause the application to acquire one or more requests from one or more of the suspended upstream service providers, and may periodically "trickle" these requests through the application and toward the downstream service provider. When a "trickled" request is successfully provided to the downstream service provider, the automatic resumption module may resume the suspended upstream service providers and thus begin processing traffic from these upstream service providers.

In some embodiments, the automatic resumption module may cause the application to acquire the one or more service requests by causing a component serving as an initial entry point to the application for an upstream service provider to, for example, retrieve a request from a queue/data structure/database/etc. (e.g., requests for a SOA application inserted into the queue by an upstream service), approve a new request received over a network, and/or send a request asking for an additional request from upstream service provider, etc.

Thus, some embodiments described herein may potentially prevent the need for a tremendous operational overhead that may otherwise be required when a downstream service fails or falters. In such cases, additional requests that would ultimately fail will not continue to be processed, and thus a substantial backlog of potentially thousands or millions of service requests that cannot be processed, need not accrue within the SOA system. Additionally, the reduction of this backlog and the reduction in failed requests being attempted may yield a significant reduction in processor utilization, network traffic utilization, memory/storage utilization, etc., during and after times of downstream service problems. In some embodiments, the system management module may automatically and rapidly detect when the downstream service provider once again becomes able to process service requests, and, in response, may re-enable typical application processing for traffic of the affected upstream service providers.

The foregoing, together with other features and embodiments will become more apparent upon referring to the following specification, claims, and accompanying drawings.

DETAILED DESCRIPTION

Figure 1:
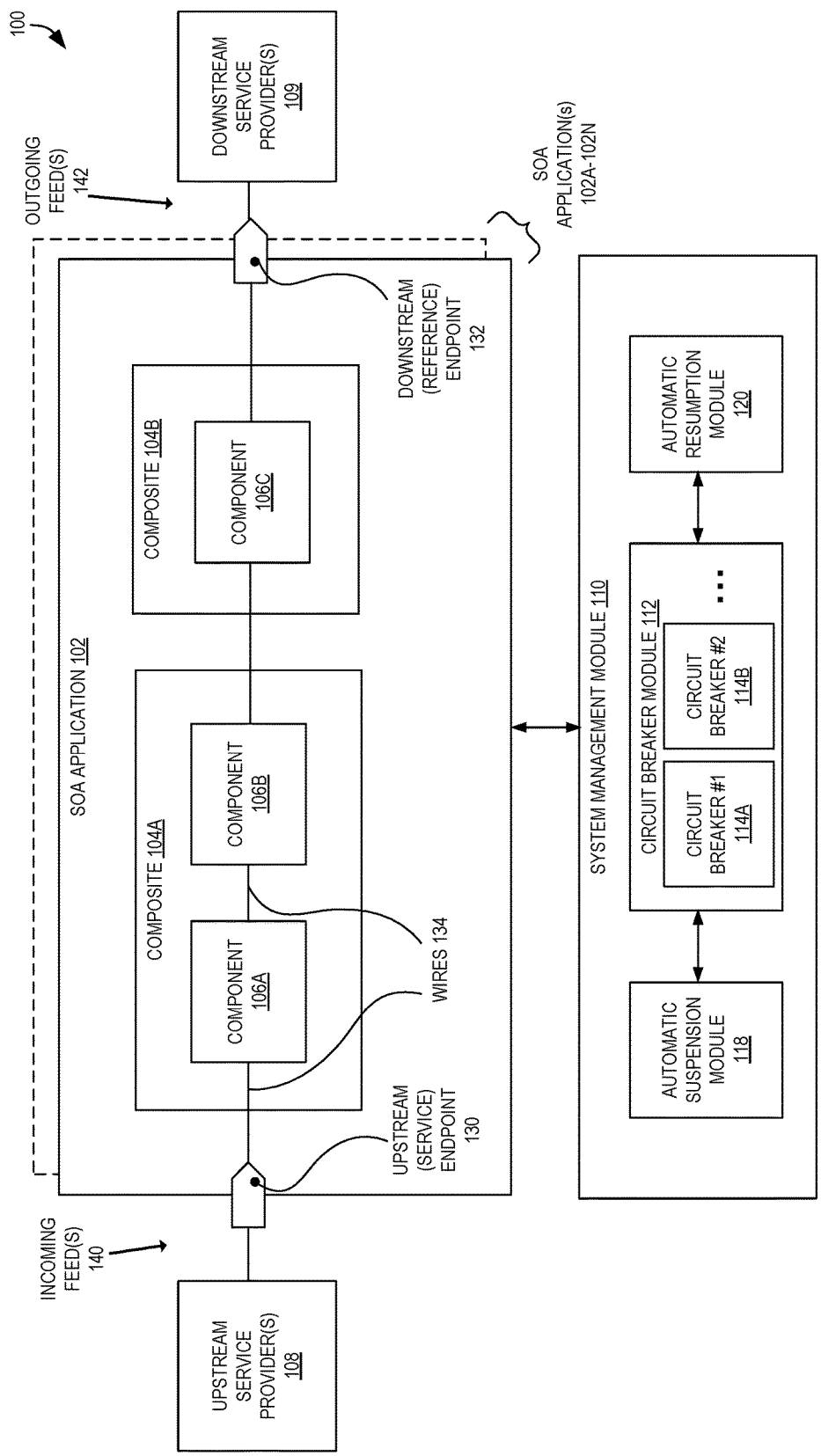
FIG. 1 illustrates a simplified high level block diagram and functional overview of a SOA system including a system management module for performing automatic upstream service resumption after downstream system failure according to some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to automatic upstream service resumption after downstream system failure. In some embodiments, the system management module may implement a circuit breaker module that maintains a circuit breaker data structure specific to a downstream endpoint leading to a downstream service provider. The circuit breaker data structure (or "circuit breaker") may have a set of configurable conditions indicating, for example, a number of requests and a time duration, which together may indicate the particular number of failed requests over an amount of time that will trigger the circuit breaker. When a circuit breaker detects that an associated downstream service provider is unable to process the configured number of requests within the predetermined window of time configured for that circuit breaker, the circuit breaker may be triggered. Upon the triggering of a circuit breaker, an automatic suspension module may identify one or more upstream services providing and/or associated with the particular failed requests, for example, the failed requests having fault entries with timestamps within the specified time window, and may trigger the circuit breaker thereby causing the application to suspend processing of new requests from the identified upstream services.

In some embodiments, the system management module also may implement an automatic resumption module, which may be configured to monitor a downstream endpoint of a downstream service provider from which one or more faults have been detected, and to determine when the downstream service provider comes back up (e.g., begins to successfully process requests). In some cases, the determination may be performed by periodically processing inbound requests, for example, from upstream service providers, and re-enabling upstream endpoints for the suspended upstream service providers in the case of success. Accordingly, in some embodiments, the automatic resumption module may determine, after the processing of traffic for one or more upstream service providers has been suspended, whether the circuit breaker-triggering downstream service provider becomes responsive again, and may automatically re-enable processing for suspended upstream service providers.

In some embodiments, the automatic resumption module may start a "trickle feed" timer for each upstream endpoint, to allow messages through at a configured retry rate. The trickle feed timer may be configured to start upon the triggering of a circuit breaker for the involved downstream service. When downstream endpoint invocation succeeds, the automatic resumption module may resume all upstream endpoints associated with the downstream endpoint. In some embodiments, trickle feed timers may be configured specifically for a particular downstream endpoint. Accordingly, the trickle feed timer for an affected downstream endpoint may affect the trickle feed for the associated upstream endpoint(s). In some embodiments, the "trickle feed" timer can be configured to "trickle" messages from a suspended service according to a configurable time interval (e.g., a "retry rate" of every one minute, every five minutes, etc.).

In some embodiments, when a downstream invocation of a "down" endpoint succeeds, all of the upstream services that were suspended for that endpoint are resumed. This downstream invocation may be the result of a "trickled" message, and/or a message being passed from a completely different flow (e.g., a message not originating from or associated with any of the suspended upstream service providers). However, in some embodiments the trickle feed timer may be configured with a retry rate value time interval of zero ('0'), which may instruct the automatic resumption module to not "trickle" affected messages, and may instead require a manual resumption of service (e.g., by an administrator's command, etc.). Further, manual resumption of service still may be enabled even if a trickle feed is in effect, and thus may allow for an "override." For example, in some scenarios, an administrator may know that a downstream service provider has resumed service, and may quickly restart service by manually resuming the flow of messages, which may occur sooner than a next message would have been trickled through according to the periodic trickle.

Thus, in some embodiments, the automatic resumption module may cause the application to acquire one or more requests from one or more of the suspended upstream service providers, and may periodically "trickle" these requests through the application and toward the downstream service provider. When a "trickled" request is successfully provided to the downstream service provider, the automatic resumption module may resume the suspended upstream service providers and thus begin processing traffic from these upstream service providers.

In some embodiments, the automatic resumption module may cause the application to acquire the one or more service requests by causing a component serving as an initial entry point to the application for an upstream service provider to, for example, retrieve a request from a queue/data structure/database/etc. (e.g., requests for a SOA application inserted into the queue by an upstream service), approve a new request received over a network, and/or send a request asking for an additional request from upstream service provider, etc.

FIG. 1 illustrates a simplified high level block diagram and functional overview of a SOA system 100, including an example service-oriented application 102, and a system management module 110 configured to perform automatic upstream service resumption after downstream system failures in the service-oriented application. It should be understood that the embodiment depicted in FIG. 1 is merely one example and is not intended to unduly limit the described embodiments of the present invention. One of ordinary skill in the art would recognize many possible variations, alternatives, and modifications to this illustrated system 100. For example, there may be more or less SOA applications 102, composites 104, components 106, service endpoints 130, reference endpoints 132, upstream service providers 108, downstream service providers 109, etc.

In this example, a first SOA application 102 is depicted as including an upstream service endpoint 130 corresponding to a point from which requests may be received from other (upstream) systems, a first composite 104A that includes two components 106A and 106B, a second composite 104B that includes one component 106C, and a downstream reference endpoint 132 corresponding to a point from which a requests/responses/messages may be transmitted to other (upstream) devices or modules. Each of the composites 104 and/or components 106 may be standalone modules—possibly from different developers/originators—and/or may execute on one computing device or across many computing devices, which may be in a same geographic location or separated in one or more different geographic locations (e.g., data centers, buildings, cities, states, countries, etc.).

In certain examples, system 100 may include one or more upstream service providers 108, and one or more downstream service providers 109. A service provider (e.g., one or both of upstream service provider 108 and downstream service provider 109) may, in various embodiments, correspond to file systems, web services, message queues, databases, backend applications, and/or any other software service capable of interacting with SOA application 102.

The terms "upstream" and "downstream" as used herein may be relative terms used to refer to the relative positioning of components within the system 100, when viewed from the perspective of an SOA application 102. For example, upstream service provider 108 may be referred to as "upstream" as the upstream service provider(s) 108 provides data/instructions for SOA application 102 to process. Similarly, downstream service provider(s) 109 may be referred to as "downstream" as the SOA application 102 provides data/instructions to the downstream service provider(s) 109. Because these terms are relative, it should be understood that, for example, service provider 108 may be an downstream service provider with respect to a different SOA application, and service provider 109 may be an upstream provider with respect to a different SOA, etc.

In some embodiments, the upstream service provider(s) 108 and downstream service provider(s) 109 are different components, which can be operated by different entities, possibly at different locations. However, in some embodiments, one or more of upstream service providers 108 and downstream service providers 109 can be a same component, different components of a same entity, etc. Thus, one service provider can be an upstream service provider 108 when it is acting to provide data/instructions to SOA application 102 (e.g., provide data of an incoming feed 140 to SOA application 102 at an upstream endpoint 130), and also be a downstream service provider 109 when it is acting as a recipient of data/instructions from SOA application 102.

Although not depicted herein, the SOA application 102 may include bindings (also referred to herein as "adapters") that may serve as a point of connection between components of the SOA application 102 and external systems (e.g., upstream service provider(s) 108 and/or downstream service provider(s) 109). In some embodiments, a binding may operate to receive an inbound request received according to a particular protocol/format, and translate the request into a different format (e.g., a standardized or normalized format) utilized internally by components of the SOA application 102. Similarly, a binding may operate to take messages of the SOA application 102 format and translate them into other protocols/formats for communication with other systems.

As an example, a Java Message Service (JMS) adapter may receive messages from internal SOA components and translate them into JMS-formatted messages to thereby allow components to communicate with external systems that understand JMS messages. Such abstraction allows components to interact with external systems that utilize different message protocols without requiring the components to perform any necessary work for constructing messages in any required formats.

In some embodiments, some or all of the components 106 within composite applications 104 may have one or more associated input and/or output queues for storing requests (also referred to as "messages"). As a request is received/retrieved at the application service endpoint, the request may be placed in a first input queue that is serviced by the first component 106A of the first composite 104A. When the first component 106A is able to process another request (or detects the existence of the request within the queue), the component removes the request from the queue, processes it, and then places the (possibly transformed) request into an "output" queue for that first component. This "output" queue for the first component 106A may simultaneously serve as an "input" queue for the second component 106B of the first composite, although in some embodiments the queues may be distinct. Of course, depending upon the configuration of the system, queues may be utilized at one or more of composite boundaries, component boundaries, subcomponent boundaries, at service/reference endpoints, etc.

The depicted SOA system 100 of the embodiment illustrated in FIG. 1 also includes a system management module 110, which may include an automatic suspension module 118, circuit breaker module 112, and/or automatic resumption module 120. In some embodiments, these modules are software modules executable by one or more processors of a computing device, and these modules may or may not be of a same computing device (or set of computing devices) that implement the SOA application 102.

The system management module 110, in some embodiments, may be configured to detect when a downstream service provider 109 has failed, and, in response, may selectively inhibit processing of (e.g., prevent receipt or entry of) additional traffic from incoming feeds of one or more upstream service providers 108 whose requests were involved (or affected by) the detected failure. Accordingly, system management module 110 can selectively stop the flow of failure-impacted and/or failure-causing traffic to avoid further overwhelming the failed downstream service provider(s) 109, as well as the SOA application 102 and underlying architecture. In some embodiments, this detection and selective inhibiting may continue to allow traffic of other upstream service providers 108 and/or downstream service providers 109 and/or other, non-problematic incoming/outgoing feeds to continue to be processed and not need to be, or become aware of, the failure(s). Accordingly, in some embodiments the SOA application 102 need not become burdened by dealing with potentially immense amounts of failure-impacted traffic, and may continue to interact with other upstream and/or downstream services in an uninterrupted manner.

In some embodiments, the system management module 110 may be configured to track, for each incoming request of an incoming feed 140 (e.g., from an upstream service provider 108), information associating the request with how and/or from where the incoming request was received. This information may be referred to herein as request metadata. Additionally, in certain embodiments, system management module 110 may identify and track which component (e.g., component 106A) of the SOA application 102 first (or "initially") received the request, and this information also may be stored as request metadata.

For example, in some cases, the component 106A may provide information to the system management module 110 including an identifier of the request, an identifier of the component, and/or an identifier of the SOA application 102 utilizing the component instance. This information can be recorded within a data structure, and/or may be transmitted to the system management module 110 using one or more of a variety of well-known techniques including IPC techniques, function calls, network messages, etc.

In some embodiments, system management module 110 instead may determine the request metadata without receiving any explicit signaling or action on the part of the component 106A itself. For example, in some embodiments the system management module 110 may include and/or may interacts with underlying hardware/software executing or controlling the SOA application 102 and/or component 106A, such as an infrastructure system service engine. By monitoring the underlying hardware and software executing or controlling the SOA application components 106, the system management module 110 may determine some or all of the request metadata without any communication from the application components 106. Thus, in such embodiments, the components 106 of the SOA application 102 need not be modified to self-report received message information.

The system management module 110 also may track "faulted" requests/messages that are or were unable to be passed "downstream" to a downstream service provider 109. For example, when the SOA application 102 is unable to place a message in an output queue associated with a downstream service provider 109, receives a "failure" response message from the downstream service provider 109, and/or cannot contact the downstream service provider 109 while attempting to send a message/request, etc., the system management module 110 may track this failure.

For example, in some embodiments, for each failed request/message detected, the system management module 110 may create a failure entry in a failure data structure. The failure entry may identify the particular downstream service provider 109, a time of the failure (detected, reported, or otherwise), an identifier of the upstream service provider 108 providing the request leading to the failure, and/or an identifier of a "initial" or involved component of the SOA application 102 that received the message from that upstream service provider 108.

Thus, in some embodiments the system management module 110 may determines that a particular request failed, may determine a timestamp of the failure (e.g., using a current system clock value or using a time value more explicitly associated with the failure), and may identify the providing upstream service (and/or "initial" component 106 processing the request) using, for example, the tracked request metadata. This data may be stored as a failure entry in a failure data structure maintained by the system management module 110.

In some embodiments, a single failure data structure configured to store all failure entries for all downstream service providers 109 may be maintained by the system management module 110. However, in other embodiments, data recording the failed messages/requests for a specific downstream service provider 109 may be stored in separate failure data structures which are specific to the downstream service provider 109.

For example, in some embodiments the system management module 110 may implement a circuit breaker module 112 that itself implements a circuit breaker data structure that is specific to a particular downstream service provider 109 (e.g., specific to a downstream endpoint 132). In some embodiments, each implemented circuit breaker 114A, 114B, etc., may maintain a data structure of failure/fault entries specific to the associated downstream service provider 109/downstream endpoint 132.

Each circuit breaker can be configured with a condition to evaluate the failure entries and determine when the circuit breaker should be triggered (e.g., when traffic to the corresponding downstream system 109 should be suspended). In some cases, the condition may specify a particular amount of time and a particular number of failures, and these values specify how many failures, when observed within a window of time specified by the designated amount of time, will cause the circuit breaker to be triggered.

For example, a first circuit breaker 114A may be configured with a specific amount of time (e.g., five minutes), and a specific number of failures (e.g., five faults). In such embodiments, the first circuit breaker 114A will continuously or periodically monitor the data structure of failure entries and determine whether the specified condition has been met. For example, the first circuit breaker 114A may identify whether, in the last five minutes, whether there have been five or more failures. If so, the first circuit breaker 114A will be triggered. If not, the first circuit breaker 114A will continue its monitoring operations.

Figure 2:
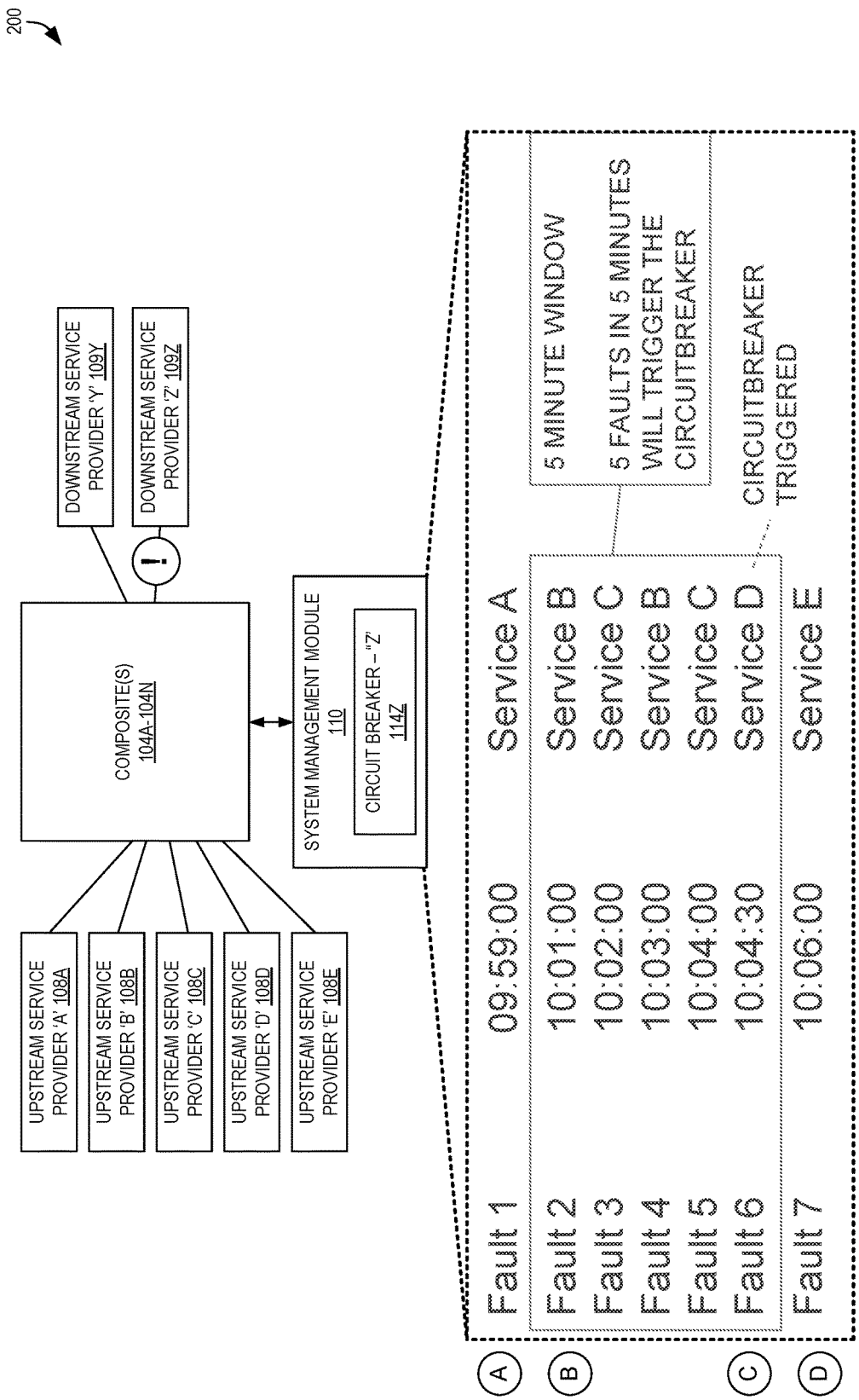
FIG. 2 illustrates exemplary fault entries leading to a triggering of a circuit breaker for automatic system suspension according to some embodiments.

An example of failure entries in a failure data structure are described with reference to FIG. 2. FIG. 2 illustrates an example set of fault entries leading to a triggering of a circuit breaker for automatic system suspension, according to certain embodiments described herein. In FIG. 2, a set of one or more composites 104A-104N are shown that receive messages/requests from five upstream service providers 108A-108E. The composites 104 in this example also publish to two downstream service providers 109Y and 109Z.

In this example, the failure data structure shown within circuit breaker "Z" 114Z shows the failures have occurred during attempts to initiate interactions with the downstream service provider 109Z, as represented by the circle including an exclamation point. Circuit breaker "Z" 114Z monitors all such failures to initiate interactions with downstream service provider 109Z. In this example, we assume that a configured condition for this circuit breaker "Z" 114Z is "5 minutes" (time) and "5 faults" (number of faults).

At circle 'A', a first fault (Fault 1) was detected and recorded as a first fault entry. Fault 1 occurred at 09:59:00, and the system management module 110 determines that the upstream service provider 'A' 108A is associated with the failed message/request (e.g., originally provided a message to the composites 104A-104N that led to the generation of the message/request that failed). This information is tracked as a failure entry. For the purpose of this discussion, we assume that no earlier faults were generated.

Of course, in various embodiments this information may not all be stored in one data structure, and some or all of this information can be determined at different times. As one example, an indicator of the associated upstream service may not be determined at the time of the fault. In some embodiments, only upon a triggering of a circuit breaker does the system management module 110 make this determination. Additionally, other information may be stored in each fault entry, such as a request identifier, etc. Thus, this figure presents a simplified view for ease of understanding.

At circle 'B', several more faults are observed with regard to downstream service provider 109Z. These faults—marked as Faults 2-5, have associated times of 10:01:00, 10:02:00, 10:03:00, and 10:04:00. These faults are also associated with upstream service provider 'B' 108B and 'C' 108C. Of note that as of this point (before Fault 6), although 5 faults have occurred (satisfying the fault amount value of the condition), these 5 faults did not happen within 5 minutes (e.g., from 9:59:00 to 10:03:59) and thus do not satisfy the specified time window part of the condition.

However, upon detection of fault 6 at circle 'C'—having a time of 10:04:30 and associated with upstream service provider 'D' 108D—the condition for circuit breaker "Z" 114Z is met, thus triggering circuit breaker "Z" 114Z.

Referring back to FIG. 1, we continue the discussion with regard to the automatic suspension module 118 of the system management module 110. In some embodiments, upon a triggering of a circuit breaker 114, the automatic suspension module 118 may detect the triggering of the circuit breaker and may automatically suspend further traffic from one or more upstream service provider(s) 108. In some embodiments, an automatic resumption module 120 may be configured to automatically resume traffic from the one or more upstream service provider(s) 108 to thus resume processing.

In some embodiments, the automatic suspension module 118 may first detect the triggering of a circuit breaker (e.g., circuit breaker 114A), and may identify one or more upstream service providers 108 to be suspended. In some embodiments, the automatic suspension module 118 may identify the one or more upstream service providers 108 that had messages fault within the configured time window of the triggered circuit breaker.

For example, turning back to FIG. 2, in some embodiments the automatic suspension module 118 may identify that failed requests associated with Service B, Service C, and Service D were within the configured time window. Accordingly, the automatic suspension module 118 determines that these three services (i.e., upstream service providers B 108B, C 108C, and D 108D) are to be suspended. Accordingly, in some embodiments, any further traffic from Service A will not yet be suspended. In other embodiments, the determination of which upstream service providers to be suspended may use a separate (e.g., longer) time window from the time window used for the circuit breaker condition. For instance, automatic suspension module 118 may determine in this case that all upstream service providers 108 that have generated traffic to the downstream service provider 109Z within a longer time window (e.g., 10 minutes, 30 minutes, etc.) may be suspended. Thus, in these embodiments, any further traffic from Service A would be suspended as well.

Continuing the example in FIG. 2, the circuit breaker "Z" 114Z may further detect another fault 7 at circle 'D' and create a fault entry. This fault may be associated with Service E (e.g., upstream service provider E 108E). The circuit breaker Z 114Z may be configured to, responsive to still being in a "triggered" state, notify the automatic suspension module 118 to suspend traffic of that service, too. However, in some embodiments the automatic suspension module 118 can be configured, upon the triggering of the circuit breaker, to monitor the set of fault entries itself, and detect when a new fault arises from a "new" upstream service provider that currently is not suspended, and cause that traffic to be suspended.

Accordingly, if Services A or E (e.g., upstream service providers 108A and 108E) were to have provided another request that would result in a failure for downstream service provider 'Z' 109Z, after the triggering of the circuit breaker (e.g., after Fault 6), then the automatic suspension module 118 may detect this failure and may cause traffic from Services A or E to be suspended.

In various embodiments, the automatic suspension module 118 may cause traffic to be suspended in a variety of different ways. In some embodiments, the automatic suspension module 118 may transmit a message or command to an identified "initial" component 106 that services requests for the particular upstream service provider(s) 108, instructing the component 106 to stop servicing requests. As a result, the component 106 may stop pulling request/message data from a queue (despite being available to do so), and/or may transmit messages (e.g., response messages to a request message) back to one or more upstream service providers 106 indicating a refusal to accept a request, etc. In some cases, the identified initial component 106 may be instructed to stop servicing requests, whereas in other cases, initial component 106 may be instructed to stop servicing only those requests the from the particular upstream service provider(s) 108 identified as those generating traffic to the downstream service provider 109Z.

Additionally or alternatively, the automatic suspension module 118 may cause an execution or support layer (providing services to or functionality for) "under" the component 106A to stop processing requests from the identified upstream service provider(s) 106. Thus, the component 106 in these embodiments might not itself directly be involved in refusing to process additional requests, and can instead in some embodiments have no visibility into the suspension.

Figure 3:
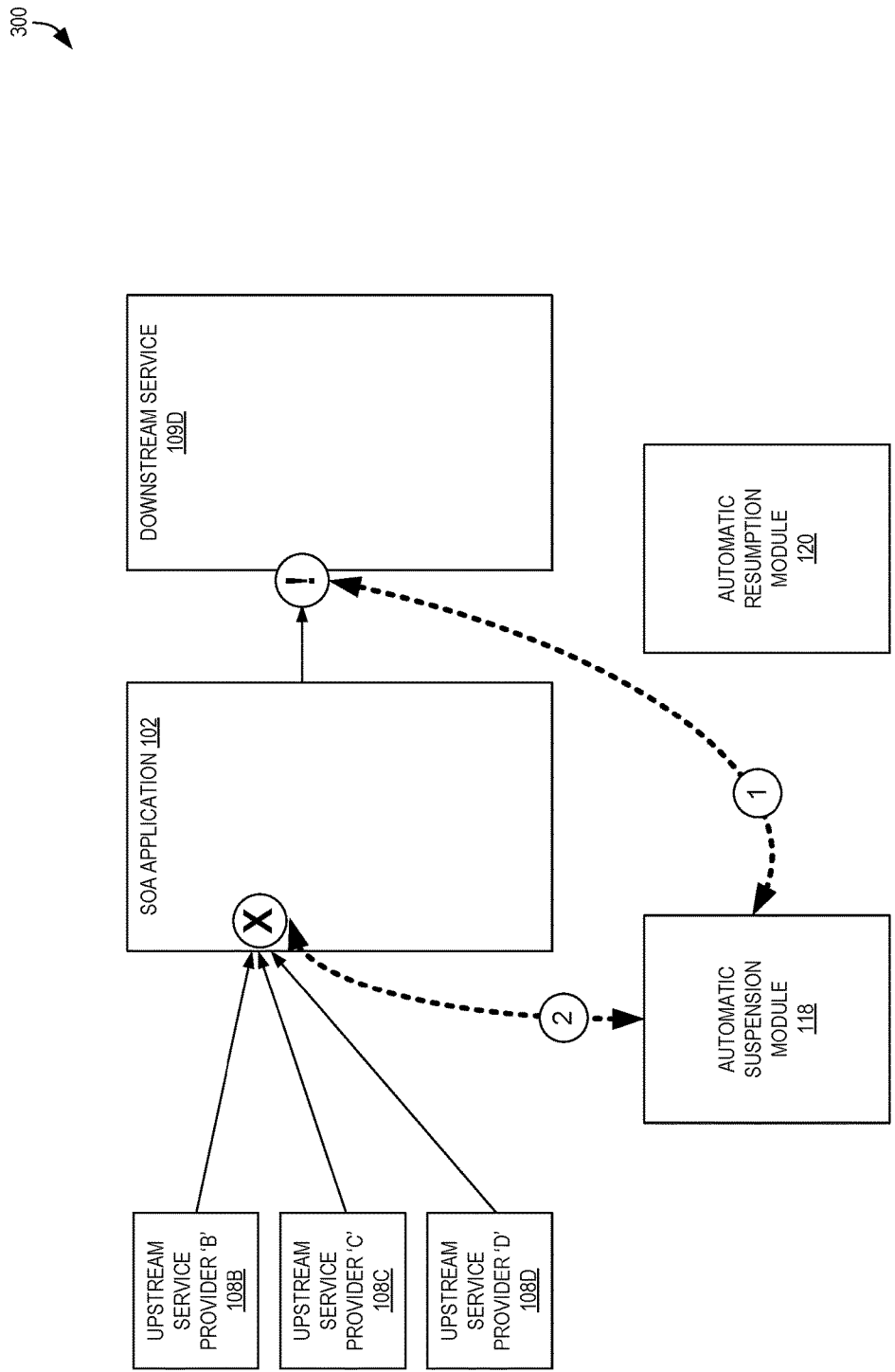
FIG. 3 illustrates a system including an exemplary SOA application and automatic suspension module detecting a downstream system fault and performing automatic system suspension according to some embodiments.

FIG. 3 illustrates a system including an exemplary SOA application 102 and automatic suspension module 118 configured to detect downstream service provider faults and to perform automatic system suspensions, according to certain embodiments described herein. In this example, a number of upstream service providers 108B-108D may send or provide requests to the SOA application 102. The SOA application 102 may be configured to process traffic from the upstream service providers 106B-106D by performing a series of operations. As a request "flows" through the SOA application 102, it may be processed by one or more composites and/or components of the SOA application 102, during which the request may or may not be modified or transformed at any step in the processing.

At some point in processing, the SOA application 102 may pass data for these processed requests to a downstream service 109D. In this example, a fault (or faults) may occur between SOA application 102 and the downstream service 109D, as indicated by the circled exclamation point. At circle '1', the automatic suspension module 118 may detects that a circuit breaker associated with the downstream service 109D has been triggered, and may identify the upstream service providers 108B-108D as providing the requests that ended up as failed requests within a configured time window. Accordingly, the automatic suspension module 118 may suspend traffic from upstream service providers 108B-108D at circle '2'. In some embodiments, at circle '2' the automatic suspension module 118 may transmit a command or message to the SOA application 102 (e.g., an "initial" component) to suspend the traffic (see circle with an 'X'), while in other embodiments the automatic suspension module 118 may cause or instruct an underlying system module executing the component or providing services to the component to suspend the traffic. This suspension may include stopping the pulling of request data from a queue, stopping accepting request messages, etc.

Along with these operations, an automatic resumption module 120 may be configured to detect a return to normalcy/active processing on the part of the downstream service 109D, and may re-enable, or end the suspension of, processing of traffic from the upstream service providers 108B-108D. The resumption of processing traffic from upstream service providers, after a downstream service provider failure has been resolved, is described in more detail below in reference to FIG. 4.

Figure 4:
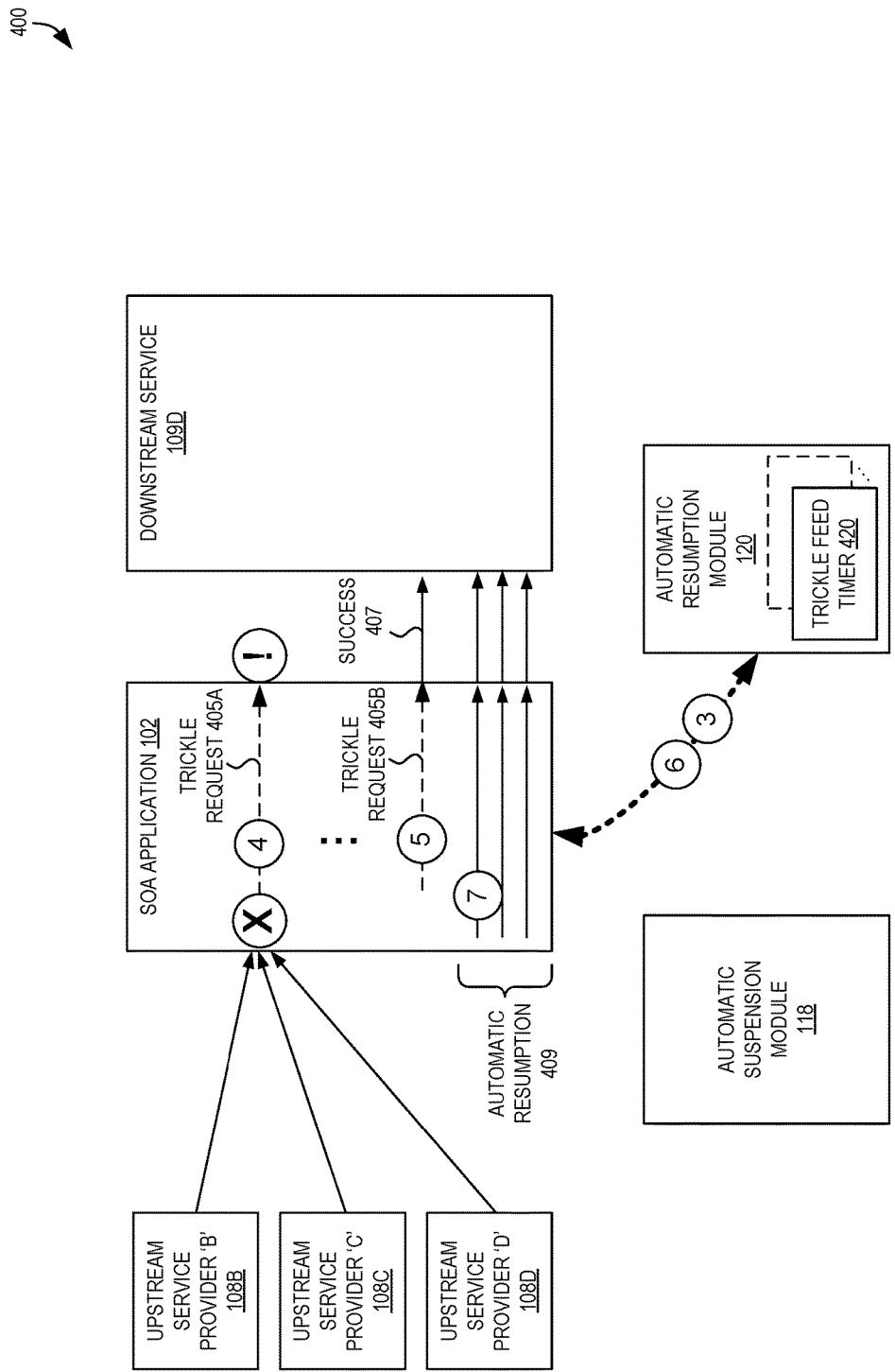
FIG. 4 illustrates a system including an exemplary SOA application and automatic suspension module utilizing trickle testing for detecting the availability of a downstream system after a failure and performing automatic upstream service resumption according to some embodiments.

FIG. 4 illustrates a system including an SOA application 102 and automatic resumption module 120 configured to use trickle testing for detecting the availability of a downstream system after a failure, and performing automatic upstream service resumption. The operations depicted in FIG. 4 may occur in a system utilizing the operations as depicted in FIG. 3; however, in other embodiments the operations of FIG. 4 may occur in a system using different operations than depicted in FIG. 3.

As discussed in the example of FIG. 3, the automatic suspension module 118 detected a triggering of a circuit breaker for downstream service 109D. However, in certain embodiments, the automatic resumption module 120 also may be configured to detect the triggering of the circuit breaker for downstream service 109D.

After the suspension of traffic processing from the upstream service providers 108B-108D, the automatic resumption module 120 may be configured to initiate and start a trickle feed timer 420 for one or more of the affected upstream service providers 108B-108D. In some embodiments, a trickle feed timer 420 may be started for each affected upstream service provider 108B-108D, while in certain embodiments only one trickle feed timer 420 may be started for one of the affected upstream service providers 108B-108D.

Each trickle feed timer 420 may be configured for a particular upstream service provider (e.g., upstream service provider 108B). Each trickle feed timer 420 may be configured with a retry rate value indicating an amount of time between attempts to process traffic of the associated upstream service provider(s), in order to attempt to successfully pass data to downstream service 109D.

For example, the illustrated trickle feed timer 420 may be associated with upstream service provider 'B' 108B, and may have a configured retry rate value of five minutes. Additionally, a second trickle feed timer 420 for upstream service provider 'C' 108C may have a same configured retry rate value (e.g., five minutes), or may be a different configured retry rate value (e.g., 1 minute, 10 minutes, etc.). Yet another trickle feed timer 420 may be started for the suspended upstream service provider 'D' 108D, which may have the same or a different retry rate, and so one.

In some embodiments, a trickle feed timer retry rate value may be configured for a specific downstream service provider. In such cases, the trickle feed timer retry rate value associated with the affected downstream service provider can be applied to each of the one or more affected upstream service providers.

Accordingly, upon the automatic resumption module 120 detecting the triggering of the circuit breaker for downstream service 109D and identifying the affected (and then suspended) upstream service providers 108B-108D, the automatic resumption module 120 may begin the trickle feed timer 420 associated with each of the affected upstream service providers 108B-108D.

Upon the expiration of any of the trickle feed timers 420 (e.g., when an amount of time equal to the retry rate value has passed), the automatic resumption module 120 may reset the trickle feed timer 420 and, at circle '3', may cause one request of the associated upstream service provider to be processed. This limited processing may be referred to as "trickle" processing, indicating that a small amount of processing is enabled instead of the "full" processing of potentially multiple requests.

At circle '4', the SOA application 102 may cause one request from the upstream service provider 108 associated with the expired trickle feed timer 420 to be processed. This request may be referred to as a trickle request 405A. In some embodiments, causing the trickle request by the SOA application 102 may include transmitting a command message to a component of the SOA application 102, for example, a command to retrieve a request from an incoming service request queue, or a command to send a request to the particular upstream service provider for another service request, etc. Additionally or alternatively, in certain embodiments, the SOA application 102 may "retry" a transmission of a previously-failed request sent to the downstream service 109D for that upstream service provider 108.

In this illustration, it may be assumed that the first trickle request 405A again fails to successfully be passed to the downstream service 109D, as indicated by the circle with the exclamation point in FIG. 4. Accordingly, depending upon the number of initiated trickle feed timers 420, and the configured retry rate values of the trickle feed timers, circle '3' may repeat again one or more times for one or more trickle feed timers/upstream service providers, as indicated by the ellipsis illustrated between circles '4' and '5'. For the purposes of this discussion, it may be assumed that each of these trickle requests similarly fails.

At some point, the downstream service 109D may resume its operation. This may occur for a variety of different reasons, for example, due to a network failure being resolved, a downstream service 109D software application or hardware being fixed/remedied, the downstream service 109D completing a resource-intensive task, etc. Regardless of the reason that the downstream service 109D has resumed operation, it may be assumed that the downstream service 109D is now able to successfully receive requests from SOA application 102.

At some point after the downstream service 109D has resumed operation, a trickle feed timer 420 will expire, and at circle '3' the automatic resumption module 120 will cause, at circle '5', another trickle request 405B to be processed for one of the upstream service providers. Because the downstream service 109D is once again functional, the request 405B will be successfully be handed off (407) to the downstream service 109D.

In some embodiments, the automatic resumption module 120 (and/or the system management module 110) may be configured to observe the result of requests transmitted to a downstream service having suspended upstream services. Thus, at circle '6' the automatic resumption module 120 may determine the success (407) of the trickle request 405B, and may cause processing for all of the suspended upstream service providers 108B-108D to be re-initiated. Thus, the upstream service providers 108B-108D will no longer be suspended, and at circle '7', service request traffic from one, many, or all of the upstream service providers 108B-108D may be processed by the SOA application 102 and may be successfully sent to downstream service 109D.

In some embodiments, the automatic resumption module 120 may instantly re-enable all traffic from all upstream service providers 108B-108D that were suspended due to the previous fault of the downstream service 109D, while in other embodiments, the automatic resumption module 120 may re-enable processing for the upstream service providers 108B-108D in multiple steps. For example, the automatic resumption module 120 may selectively re-enable processing of requests first for upstream service provider 108B, and, after a period of time has passed with the downstream service 109D still being functional and/or responsive, then the automatic resumption module 120 may re-enable processing of requests for next upstream service provider 108C, and so on. Additionally or alternatively, the automatic resumption module 120 may rate limit a re-enabled upstream service provider for a configured period of time, such that the SOA application 102 will only process a certain amount of request traffic during this time.

Thus, using one or more of the above multi-step re-enablement techniques, the SOA application 102 may slowly ramp-up processing to avoid inundating the components and/or composites of the application 102, as well as the downstream service 109D, with a huge amount of traffic at once. Such ramp-up techniques may be especially beneficial when downstream service 109D has not fully recovered from the issues causing its previous faults, for example, a large load, a network route flap, etc., and thus such techniques may prevent large "churns" back and forth from a downstream service 109D repeatedly being viewed as "up" and then "down."

Although the above description describes how the success 407 of a trickle request 405B may lead to the automatic resumption module 120 detecting the availability of downstream service 109D, in some embodiments other traffic (e.g., service requests/traffic not associated with suspended upstream service providers 108B-108D) may cause the success 407 to be identified and the automatic resumption module 120 to re-enable processing for upstream service providers 108B-108D. For example, another upstream service provider 106T (not illustrated) may send a request to SOA application 102. In this example, it may be assumed that traffic of upstream service provider 106T was not included in the fault time window causing the triggering of the circuit breaker, and thus the traffic of upstream service provider 106T was not suspended. Continuing this example, a request of upstream service provider 106T may be received, processed, and passed to downstream service 109D, despite traffic for upstream service providers 108B-108D being suspended. In some embodiments, this request of upstream service provider 106T may successfully 407 be passed to downstream service 109D, which can be detected by automatic resumption module 120 and lead to the re-enabling of processing of requests from the suspended upstream service providers 108B-108D, described herein.

In various embodiments, the entities depicted in FIGS. 1-4 (and other entities, such as client devices, etc.) may be implemented by computing devices of various types including, but not limited to, personal computers (PCs), desktops, mobile or handheld devices such as laptops, mobile phones, tablets, etc., and other types of devices. Some or all of the entities depicted herein may utilize one or more communication networks to facilitate communications. The one or more communication networks can include networks of various types, each possibly including one or more networking devices or equipment including but not limited to network switches, routers, bridges, load balancers, etc. Examples of one or more communication networks include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), Open-Flow, IPX (Internetwork Packet Exchange), SAN (Storage Area Network) protocols, AppleTalk, Bluetooth, Long-Term Evolution (LTE), and other protocols.

An exemplary flow is now presented in accordance with certain embodiments of the invention. The operations of this flow and flow diagram are described with reference to the illustrative embodiments of the other diagrams. However, it should be understood that the operations of this flow diagram can be performed by embodiments of the invention other than those discussed with reference to these other diagrams, and the embodiments of the invention discussed with reference these other diagrams can perform operations different than those discussed with reference to the flow diagram. Though the flow diagram shows a particular order of operations performed by certain embodiments, it should be understood that such order is exemplary (e.g., alternative embodiments may perform the operations in a different order, combine certain operations, overlap certain operations, etc.).

Figure 5:
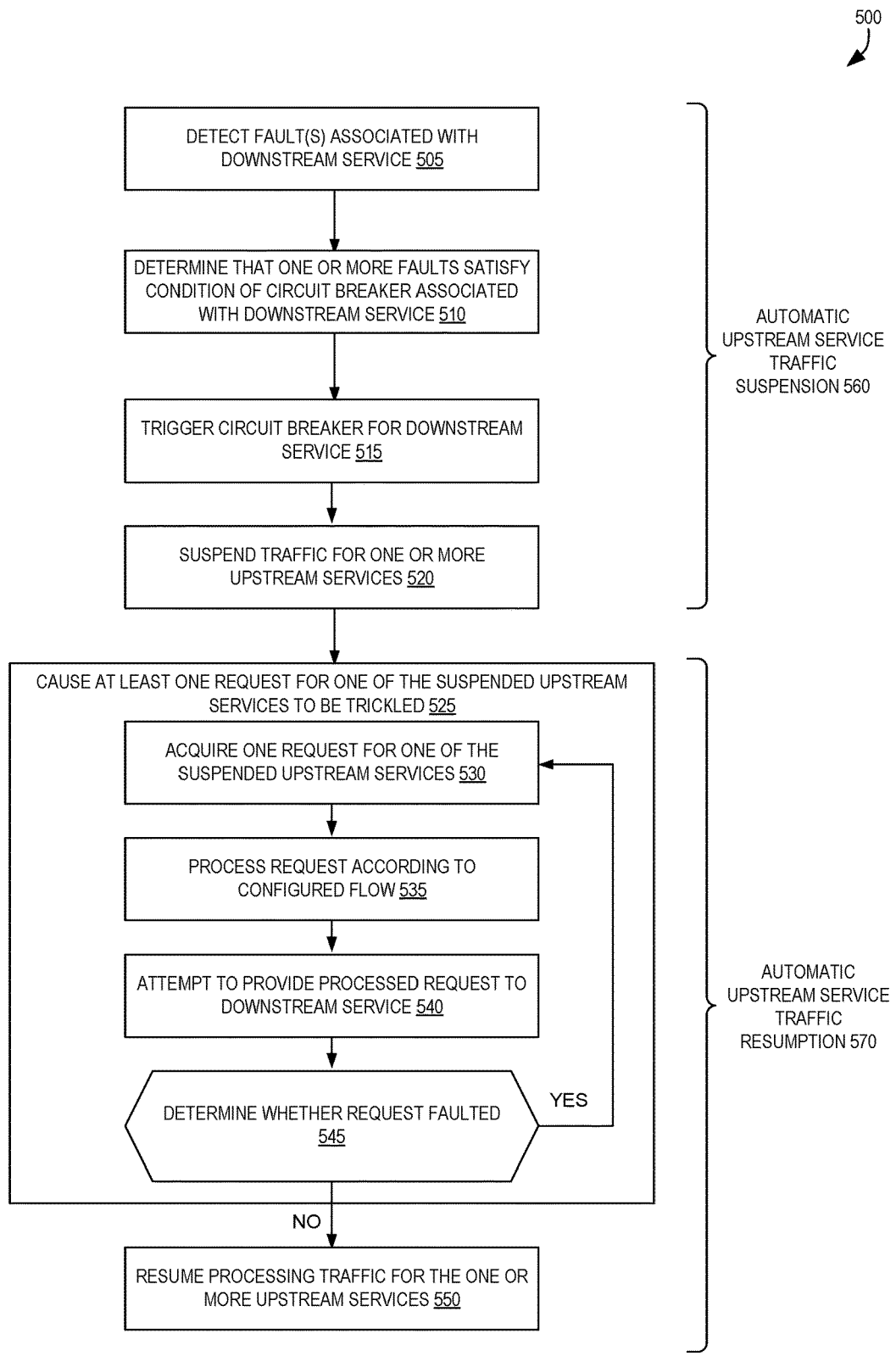
FIG. 5 is an illustrative flow diagram showing an example process of performing upstream service resumption after downstream system failure, in accordance with one or more embodiments of the present invention.

The processing depicted in FIG. 5 may be implemented in software (e.g., code, instructions, program) executed by one or more processing units (e.g., processor cores), hardware, or combinations thereof. The software may be stored in memory (e.g., on a memory device, on a non-transitory computer-readable storage medium, etc.). The particular series of processing steps depicted in FIG. 5 is not intended to be limiting.

FIG. 5 illustrates an exemplary flow 500 for performing automatic upstream service resumption after downstream system failure. In some embodiments, the some or all of the process steps depicted in FIG. 5 may be performed by the system management module 110 depicted in FIG. 1. Additionally or alternatively, some or all of these operations may be performed by the automatic suspension module 118, and in some embodiments, certain of these operations may be performed by the automatic resumption module 120.

In this example, the flow diagram 500 generally depicts two separate but related high-level operations: automatic upstream service traffic suspension 560, and automatic upstream service traffic resumption 570.

At block 505, the system management module 110 may detect one or more faults associated with a downstream service.

At block 510, the system management module 110 may determine that one or more faults satisfy a condition of a circuit breaker associated with downstream service. The condition may specify a number of faults involving the downstream service that must occur over an amount of time, in order for the circuit breaker to be triggered. Accordingly, the condition may be "satisfied" by a set of one or more faults, where the set of faults includes at least the condition-specified number of faults, and each of the set of faults occurred within a window of time representing the condition-specified amount of time.

At block 515, the system management module 110 may trigger the circuit breaker for the downstream service, and at block 520, may suspend traffic for one or more upstream services based on the satisfaction of the circuit breaker triggering conditions for the downstream service. In some embodiments, the particular one or more upstream services to be suspended may be identified as those upstream services sending (or originating) traffic that ultimately resulted in a fault that was part of the condition-satisfying set of faults. In other embodiments, the determination of which upstream service providers to be suspended may use a separate (e.g., longer) time window from the time window used for the circuit breaker condition. For instance, automatic suspension module 118 may determine that all upstream service providers 108 that have generated traffic to the downstream service provider within a longer time window than the time window associated with the circuit breaker triggering conditions, may be suspended.

At block 525, the system management module 110 (and/or automatic suspension module 118 or automatic resumption module 120) may cause at least one request for one of the suspended upstream services to be "trickled." In some embodiments, block 525 may occur responsive to the circuit breaker being triggered in block 515, and may include initiating one or more trickle feed timers 420 for one or more upstream service providers suspended in block 520.

In some embodiments, block 525 may include, at block 530, acquiring one request for one of the suspended upstream services. This may occur for a particular suspended upstream service associated with a trickle feed timer that has expired. In some embodiments, acquiring a request may include causing a specific component 106 within the application 102 to read a request from a queue. Additionally or alternatively, acquiring a request may include causing a specific component 106 within the application 102 to send a message to the suspended upstream service to ask for a request. Further, in some embodiments, the request may be acquired from a set of "failed" requests stored by the application, for example, a stored set of requests that were not successfully passed to the downstream service, such as those associated with the set of faults that triggered the circuit breaker.

At block 535, the request may be processed by the application 102 according to the configured flow for the request, which may include passing the between one or more components 106 of the application 102, and potentially may include transforming or modifying the request at some or all of the components 106 within the processing flow. Additionally, the request processing may include, at block 540, attempting to provide the processed request to the downstream service.

If the processed request was determined to have been successfully provided to the downstream service (e.g., no fault occurred) (545:Yes), then the system management module 110 (and/or automatic suspension module 118 or automatic resumption module 120) may cause traffic of the suspended upstream services to begin to be processed again. This may occur all at once, or according to a gradual, step-wise approach to resuming processing, as discussed above.

Otherwise, in some embodiments, when the request that was attempted to be provided to the downstream service faulted (545:Yes), then the flow 500 may continue back to 530 to await the expiration of another trickle feed timer 420.

As noted above regarding block 550, in some cases the processing of suspended upstream services may resume all at once, while in other cases the processing may be resumed gradually and/or step-wise. For example, when a service is resumed, the automatic resumption module 120 may be configured to "throttle up" or gradually increase the flow of incoming messages to the downstream service, so that the downstream service does not become overwhelmed by the rapid increase of new incoming messages. For instance, in the case of events and adapters, if the forwarding of all incoming messages is immediately resumed without delay to the downstream service in step 550, and the downstream service is not yet fully operational or is still ramping up with respect to capacity and resource usage, then the new incoming messages may potentially build up while suspended causing the downstream service to spend all of its cycles processing these messages once resumed.

Accordingly, in some embodiments, the automatic resumption module 120 may implement a configurable delay between messages/requests during the throttling up of message processing to the downstream service in step 550. Such delays may be ramped down to zero over a configurable period of time. In some embodiments, the automatic resumption module 120 may maintain and use one or more configurable properties to control the throttling up of message processing in step 550. For instance, a first property (e.g., a resume initial delay property) may store a first time duration (e.g., in milliseconds) to wait between processing successive messages when resuming an endpoint, and a second property (e.g., a resume ramp-up time property) storing a second time duration (e.g., in minutes), after which the resume initial delay property will be reduced to zero. In this example, the first resume initial delay property may guard against failure buildup in the event that the downstream service goes down again during the resumption in step 550. The second resume ramp-up time property may correspond to the time duration (e.g., 5 minutes) after which the automatic resumption module 120 may assume that the downstream service is fully operational, and may resume forwarding messages to the downstream service without delay.

It should be understood that the operations describe in this example are illustrative only and do not include many other possibilities of the various embodiments. For example, in some embodiments, another processed request (e.g., not originating from one of the suspended upstream services) may be successfully passed to the downstream service, which may be detected and may cause processing to be resumed for the suspended upstream services in block 550. Additionally, many other variations such as those described elsewhere herein are possible, and thus this flow diagram is to be viewed as exemplary of one possible flow 500.

Figure 6:
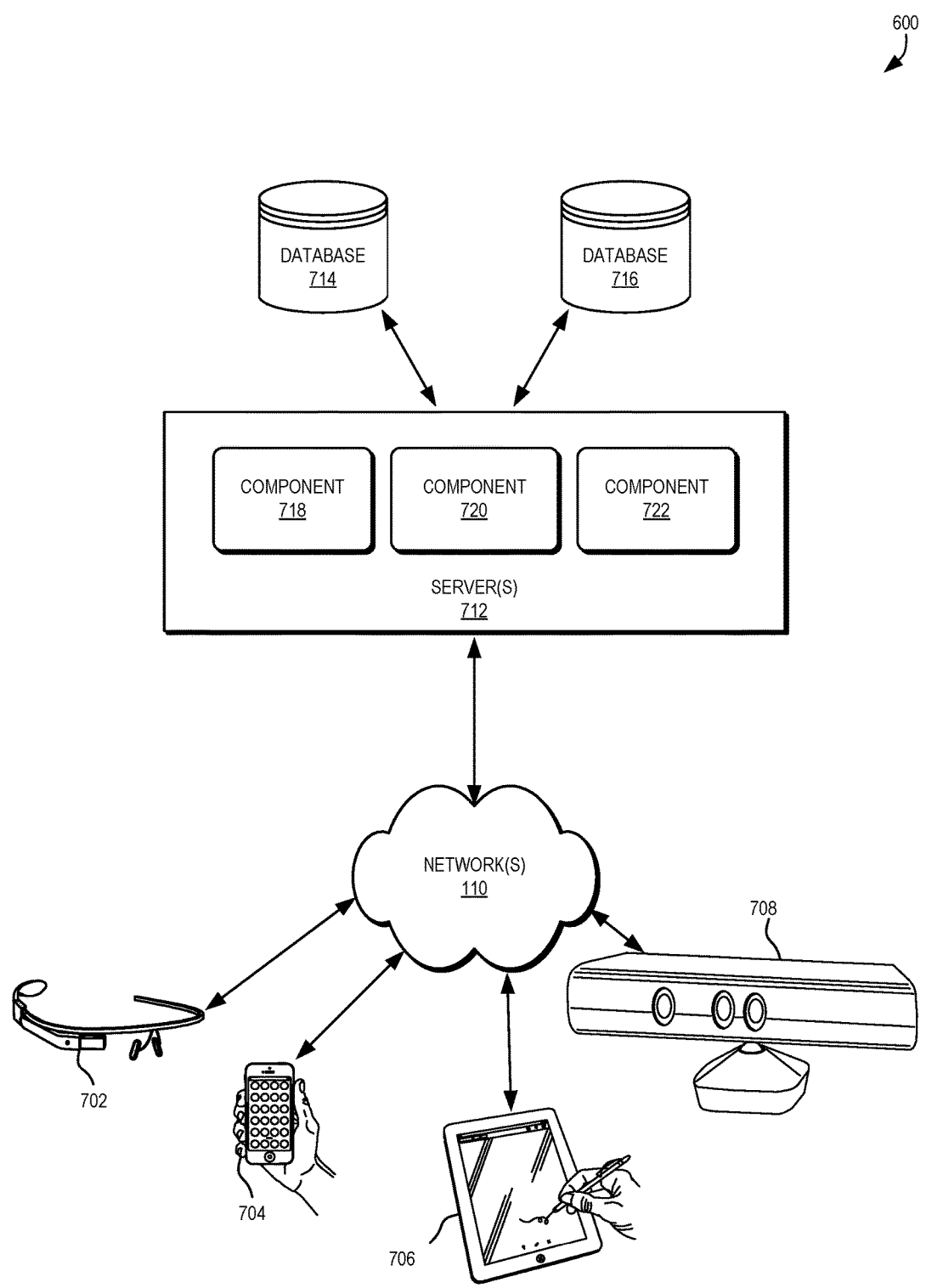
FIG. 6 illustrates a simplified diagram of a distributed system for implementing some embodiments of the present invention.

FIG. 6 illustrates a simplified diagram of a distributed system for implementing some embodiments of the present invention. In the illustrated embodiment, distributed system 600 includes one or more client computing devices 702, 704, 706, and 708, which are configured to execute and operate a client application such as a web browser, proprietary client (e.g., Oracle Forms), or the like over one or more network(s) 110. Server 712 may be communicatively coupled with remote client computing devices 702, 704, 706, and 708 via network 110.

In various embodiments, server 712 may be adapted to run one or more services or software applications such as services and applications that provide SAO system processing. In certain embodiments, server 712 may also provide other services or software applications that can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 6, software components 718, 720, and 722 of system 600 are shown as being implemented on server 712.

These components may include one or more of underlying SOA system backend components, the components/composites of a SOA application 102, the system management module of FIG. 1, etc.

In other embodiments, one or more of the components of system 600 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 702, 704, 706, and/or 708 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 600 in FIG. 6 is shown with four client computing devices, any number of client computing devices may be supported. Other devices, such as devices with sensors, etc., may interact with server 712.

Network(s) 110 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 600 may also include one or more databases 714 and 716. These databases may provide a mechanism for storing information such as user interactions information, usage patterns information, adaptation rules information, and other information used by embodiments of the present invention.

For example, databases 714 and/or 716 may store tracked request metadata and/or fault entries as described herein.

As another example, databases 714 and 716 may store backend SOA data and/or store data for specific SOA applications.

Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 7:
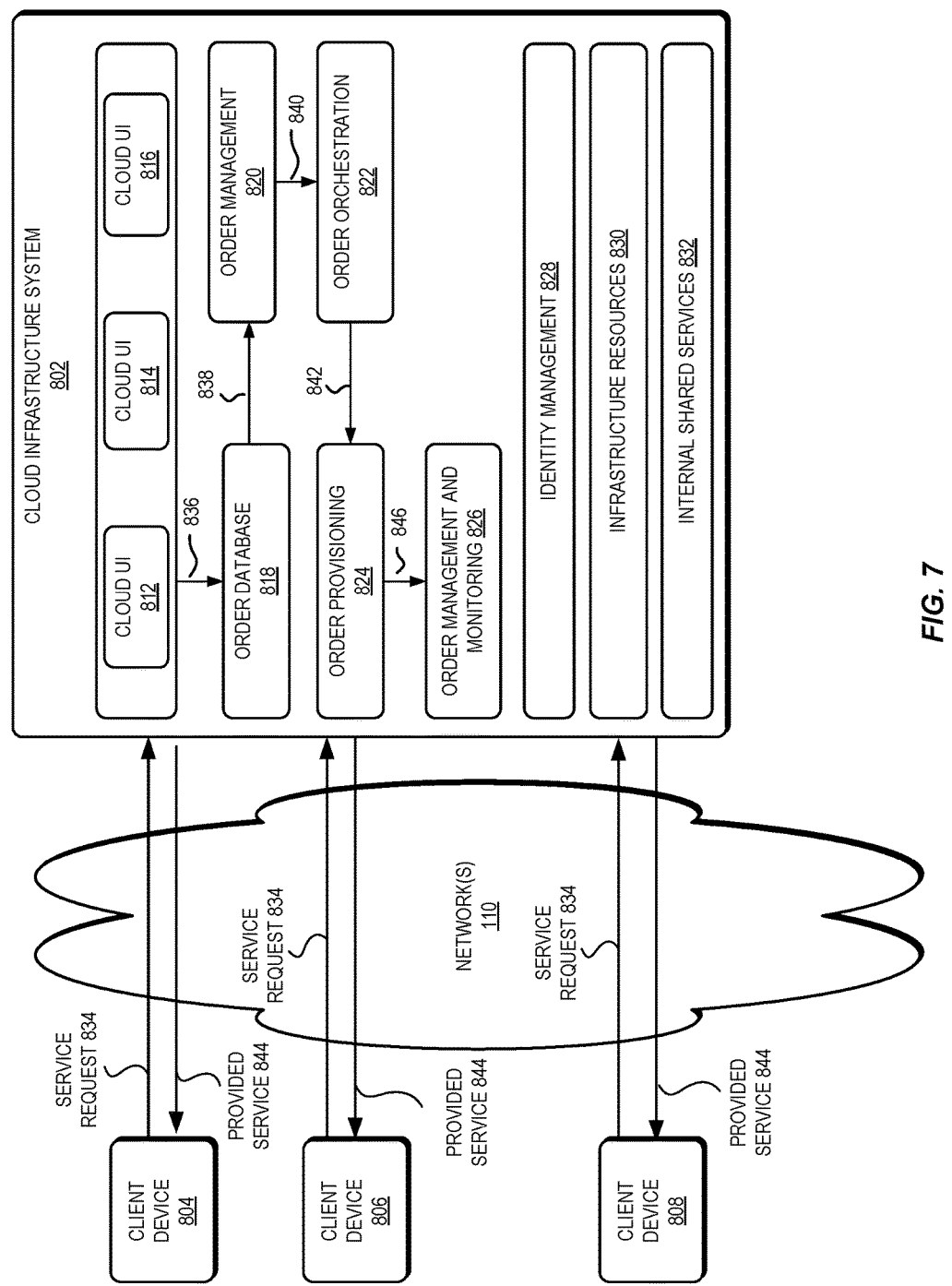
FIG. 7 is a simplified block diagram of one or more components of a system environment in which services may be offered as cloud services, in accordance with some embodiments of the present invention.

In some embodiments, the SOA system/applications may be offered as services via a cloud environment. FIG. 7 is a simplified block diagram of one or more components of a system environment 700 in which services may be offered as cloud services, in accordance with some embodiments of the present disclosure. In the illustrated embodiment in FIG. 7, system environment 700 includes one or more client computing devices 804, 806, and 808 that may be used by users to interact with a cloud infrastructure system 802 that provides cloud services. Cloud infrastructure system 802 may comprise one or more computers and/or servers that may include those described above for server 712.

It should be appreciated that cloud infrastructure system 802 depicted in FIG. 7 may have other components than those depicted. Further, the embodiment shown in FIG. 7 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 700 is shown with three client computing devices, any number of client computing devices may be supported. Other devices such as devices with sensors, etc. may interact with cloud infrastructure system 802.

Network(s) 110 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 110.

In certain embodiments, services provided by cloud infrastructure system 802 may include a host of services that are made available to users of the cloud infrastructure system on demand. In addition to services related to providing SOA application services, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services, and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 802, and the like.

In one embodiment, as depicted in FIG. 7, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 7, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 700 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 828 that is configured to provide identity services, such as access management and authorization services in cloud infrastructure system 700. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 8:
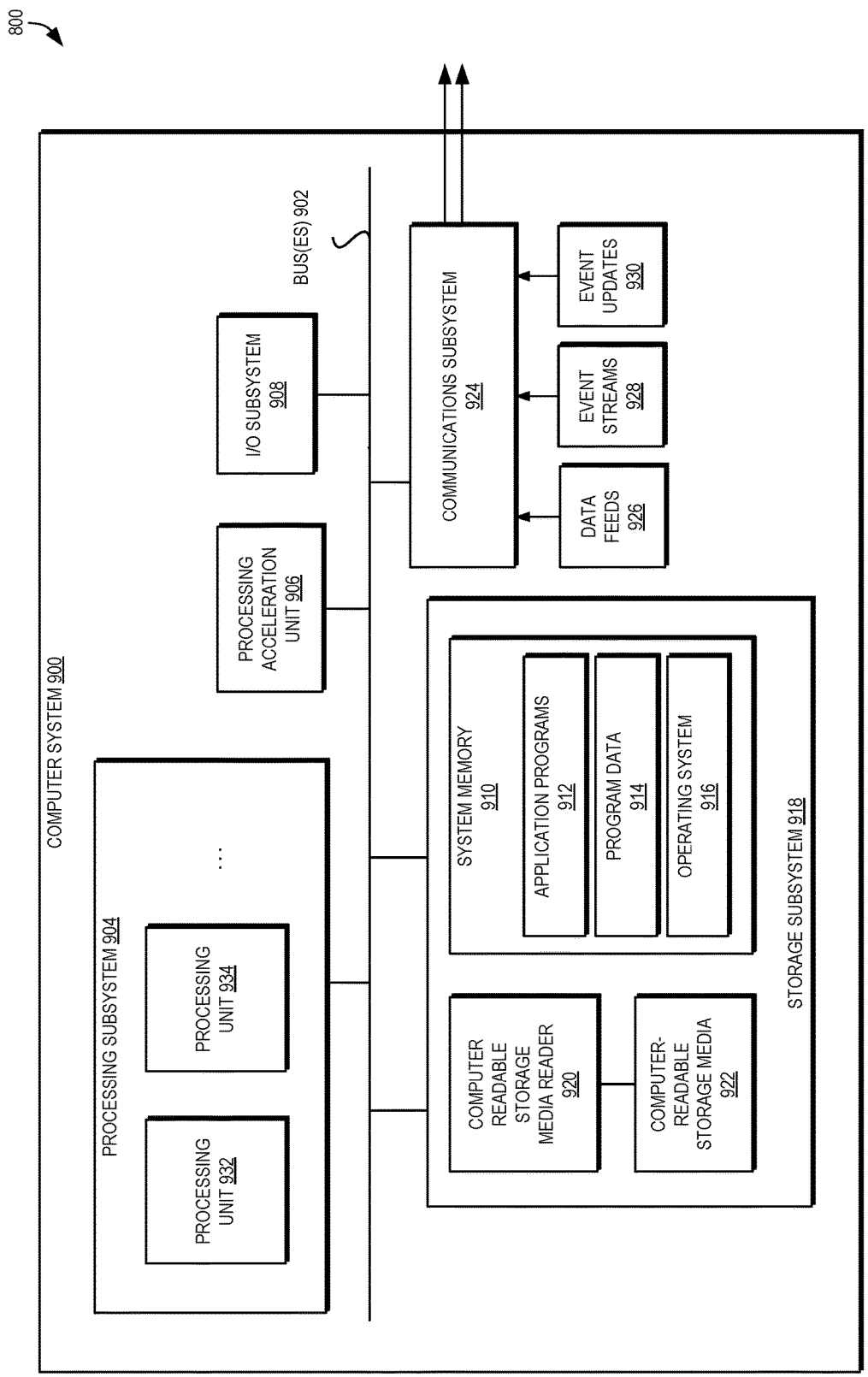
FIG. 8 illustrates an exemplary computer system that may be used to implement certain components according to some embodiments of the present invention.

FIG. 8 illustrates an exemplary computer system 800 that may be used to implement certain components according to some embodiments of the present invention. In some embodiments, computer system 800 may be used to implement any of the various servers and computer systems described above. As shown in FIG. 8, computer system 800 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 800 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 800 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors (GPUs), digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for providing the performance analysis and bottleneck detection in service-oriented applications.

In certain embodiments, a processing acceleration unit 906 may be provided for performing customized processing or for off-loading some of the processing performed by processing subsystem 904 so as to accelerate the overall processing performed by computer system 800.

I/O subsystem 908 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 800. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 8, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 8, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. Computer-readable media 922 may provide storage of computer-readable instructions, data structures, program modules, and other data for computer system 800.

In certain embodiments, storage subsystem 800 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 924 provides an interface to other computer systems and networks. Communications subsystem 924 serves as an interface for receiving data from and transmitting data to other systems from computer system 800. For example, communications subsystem 924 may enable computer system 800 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A system, comprising:
one or more application servers, each application server configured to:
execute a plurality of composites of an application;
receive and process service requests from one or more upstream service providers; and
pass the processed service requests to one or more downstream service providers; and
a computing device configured to execute a system management module, the computing device comprising:
a processing unit comprising one or more processors;
one or more network interfaces communicatively coupled with the one or more processors; and
memory coupled with and readable by the processing unit and storing therein a set of instructions which, when executed by the processing unit, causes the computing device to:
detect one or more faults within a plurality of service requests sent from the application to a downstream service provider;
identify a plurality of upstream service providers associated with the application;
cause the application to suspend processing of requests between the identified plurality of upstream service providers and the downstream service provider;
initiate a first trickle feed timer configured to control the flow of service requests between a first upstream service provider of the plurality of upstream service providers and the downstream service provider, wherein the first trickle feed timer is configured to expire following a first predetermined amount of time;
initiate a second trickle feed timer configured to control the flow of service requests between a second upstream service provider of the plurality of upstream service providers and the downstream service provider, wherein the second trickle feed timer is configured to expire following a second predetermined amount of time different from the first predetermined amount of time;
in response to the expiration of the first trickle feed timer, cause the application to provide one or more additional service requests from the first upstream service provider to the downstream service provider;
in response to the expiration of the second trickle feed timer, cause the application to provide one or more additional service requests from the second upstream service provider to the downstream service provider;
determine that one or more of the additional service requests was successfully processed by the downstream service provider; and
in response to said determination, cause the application to enable processing of requests between one or more of the identified plurality of upstream service providers and the downstream service provider.

2. The system of claim 1, wherein causing the application to suspend processing of requests between the plurality of upstream service providers and the downstream service provider comprises:
identifying first circuit breaker conditions associated with the downstream service provider; and
determining that the one or more faults detected within the plurality of service requests, from the application to the downstream service provider, satisfy the first circuit breaker conditions.

3. The system of claim 1, wherein the one or more additional service requests that were successfully processed by the downstream service provider, originated from an upstream service provider other than the first or second upstream service providers.

4. The system of claim 1, wherein the one or more additional service requests that were successfully processed by the downstream service provider, was transmitted from the first upstream service provider for which the processing of requests was suspended, in response to the expiration of the first trickle feed timer.

5. The system of claim 4, wherein causing the application to provide the one or more additional service requests from the first upstream service provider to the downstream service provider comprises causing the application to:
acquire the one or more additional service requests from the first upstream service provider associated with the first trickle feed timer;
process the one or more additional service requests; and
attempt to provide the processed additional service requests to the downstream service provider.

6. The system of claim 5, wherein acquiring the one or more additional service requests from the first upstream service provider associated with the first trickle feed timer comprises instructing a component of the application to retrieve the one or more additional service requests from a queue associated with the first upstream service provider.

7. The system of claim 5, wherein acquiring the one or more additional service requests from the first upstream service provider associated with the first trickle feed timer comprises instructing the application to send a message to the first upstream service provider associated with the first trickle feed timer to solicit the one or more additional service requests.

8. The system of claim 4, wherein causing the application to enable processing of requests includes causing the application to enable processing of requests from at least the second upstream service provider different from the first upstream service provider.

9. The system of claim 1, wherein the application comprises a service-oriented architecture (SOA) application including one or more components, and
wherein detecting the faults within the plurality of service requests and determining that the additional service request was successfully processed by the downstream service provider each comprises receiving data by the system management module from the one or more components of the SOA application.

10. The system of claim 1, wherein the application comprises a service-oriented architecture (SOA) application including one or more components, and
wherein detecting the faults within the plurality of service requests and determining that the additional service request was successfully processed by the downstream service provider each comprises receiving data from an infrastructure system service engine controlling the execution of the SOA application.

11. A method, comprising:
detecting, by a system management module executing on a computing device, one or more faults within a plurality of service requests sent via a service-oriented architecture (SOA) application to a downstream service provider;
identifying, by the system management module, a plurality of upstream service providers associated with the SOA application;
causing, by the system management module, the SOA application to suspend processing of requests between the identified plurality of upstream service providers and the downstream service provider;
initiating a first trickle feed timer configured to control the flow of service requests between a first upstream service provider of the plurality of upstream service providers and the downstream service provider, wherein the first trickle feed timer is configured to expire following a first predetermined amount of time;
initiating a second trickle feed timer configured to control the flow of service requests between a second upstream service provider of the plurality of upstream service providers and the downstream service provider, wherein the second trickle feed timer is configured to expire following a second predetermined amount of time different from the first predetermined amount of time;
in response to the expiration of the first trickle feed timer, causing the SOA application to provide one or more additional service requests from the first upstream service provider to the downstream service provider;
in response to the expiration of the second trickle feed timer, causing the SOA application to provide one or more additional service requests from the second upstream service provider to the downstream service provider;
determining, by the system management module, that one or more of the additional service requests was successfully processed by the downstream service provider; and
in response to said determination, causing, by the system management module, the SOA application to enable processing of requests between one or more of the identified plurality of upstream service providers and the downstream service provider.

12. The method of claim 11, wherein causing the SOA application to suspend processing of requests between the plurality of upstream service providers and the downstream service provider comprises:
identifying first circuit breaker conditions associated with the downstream service provider; and
determining that the one or more faults detected within the plurality of service requests, from the SOA application to the downstream service provider, satisfy the first circuit breaker conditions.

13. The method of claim 11, wherein the one or more additional service requests that were successfully processed by the downstream service provider, originated from an upstream service provider other than the first or second upstream service providers.

14. The method of claim 11, wherein the one or more additional service requests that were successfully processed by the downstream service provider, was transmitted from the first upstream service provider for which the processing of requests was suspended, in response to the expiration of the first trickle feed timer.

15. The method of claim 14, wherein causing the SOA application to provide the one or more additional service requests from the first upstream service provider to the downstream service provider comprises causing the SOA application to:
acquire the one or more additional service requests from the first upstream service provider associated with the first trickle feed timer;
process the one or more additional service requests; and
attempt to provide the processed additional service requests to the downstream service provider.

16. The method of claim 15, wherein acquiring the one or more additional service requests from the first upstream service provider associated with the first trickle feed timer comprises instructing a component of the SOA application to retrieve the one or more additional service requests from a queue associated with the first upstream service provider.

17. The method of claim 15, wherein acquiring the one or more additional service requests from the first upstream service provider associated with the first trickle feed timer comprises instructing the SOA application send a message to the first upstream service provider associated with the first trickle feed timer to solicit the one or more additional service requests.

18. The method of claim 14, wherein causing the SOA application to enable processing of requests includes causing the application to enable processing of requests from at least the second upstream service provider different from the first upstream service provider.

19. A non-transitory computer-readable memory comprising a set of computer-readable instructions stored therein which, when executed by a computer system comprising one or more processors, causes the computer system to:
detect one or more faults within a plurality of service requests sent via a service-oriented architecture (SOA) application to a downstream service provider;
identify a plurality of upstream service providers associated with the SOA application; cause the SOA application to suspend processing of requests between the identified plurality of upstream service providers and the downstream service provider;
initiate a first trickle feed timer configured to control the flow of service requests between a first upstream service provider of the plurality of upstream service providers and the downstream service provider, wherein the first trickle feed timer is configured to expire following a first predetermined amount of time;
initiate a second trickle feed timer configured to control the flow of service requests between a second upstream service provider of the plurality of upstream service providers and the downstream service provider, wherein the second trickle feed timer is configured to expire following a second predetermined amount of time different from the first predetermined amount of time;
in response to the expiration of the first trickle feed timer, cause the SOA application to provide one or more additional service requests from the first upstream service provider to the downstream service provider;
in response to the expiration of the second trickle feed timer, cause the SOA application to provide one or more additional service requests from the second upstream service provider to the downstream service provider;
determine that one or more of the additional service requests was successfully processed by the downstream service provider; and
in response to said determination, cause the SOA application to enable processing of requests between one or more of the identified plurality of upstream service providers and the downstream service provider.

20. The non-transitory computer-readable memory of claim 19, wherein the one or more additional service requests that were successfully processed by the downstream service provider, originated from an upstream service provider other than the first or second upstream service providers.

* * * * *

UNITED STATES PATENT AND TRADEMARK OFFICE
CERTIFICATE OF CORRECTION

PATENT NO. : 10,355,952 B2  
APPLICATION NO. : 15/099332  
DATED : July 16, 2019  
INVENTOR(S) : Sengupta et al.

Page 1 of 1

It is certified that error appears in the above-identified patent and that said Letters Patent is hereby corrected as shown below:

In the Drawings

On Sheet 2 of 8, in FIG. 2, Line 17, Delete "CIRCUITBREAKER" and insert -- CIRCUIT BREAKER --, therefor.

On Sheet 2 of 8, in FIG. 2, Line 19, Delete "CIRCUITBREAKER" and insert -- CIRCUIT BREAKER --, therefor.

Signed and Sealed this  
Twenty-eighth Day of July, 2020

Andrei Iancu  
*Director of the United States Patent and Trademark Office*